2 Sheets—Sheet 1.
W. R. DICKSON.
GRINDING OR POLISHING MACHINE.
No. 10,812. Reissued Mar. 1, 1887.
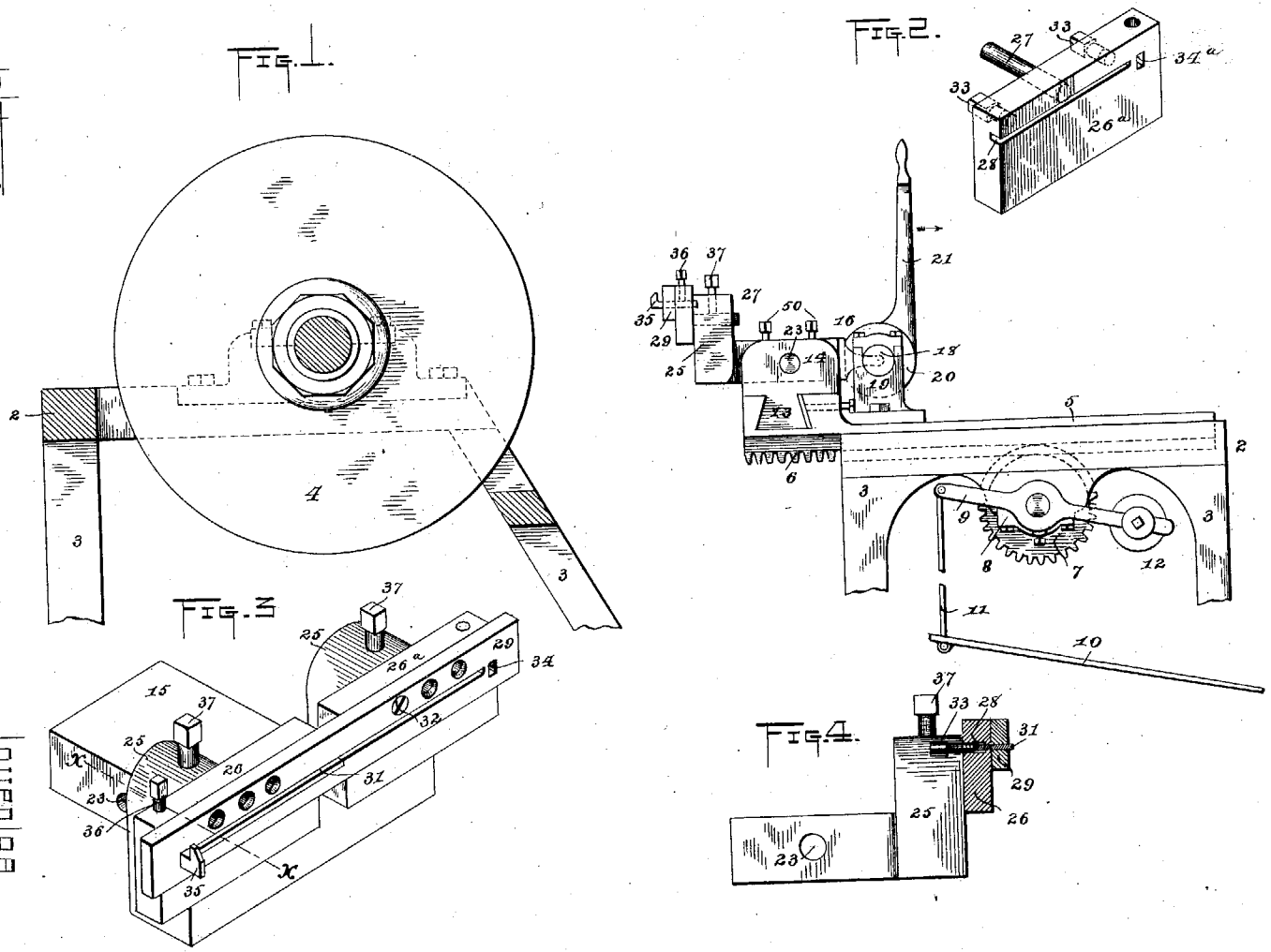
Witnesses
S. Lochboehler
James H. Bakewell
Inventor
W. R. Dickson
by his attorneys
Bakewell & Kerr
N. PETERS, Photo-Lithographer, Washington, D. C.

2 Sheets—Sheet 2.
W. R. DICKSON.
GRINDING OR POLISHING MACHINE.
No. 10,812. Reissued Mar. 1, 1887.
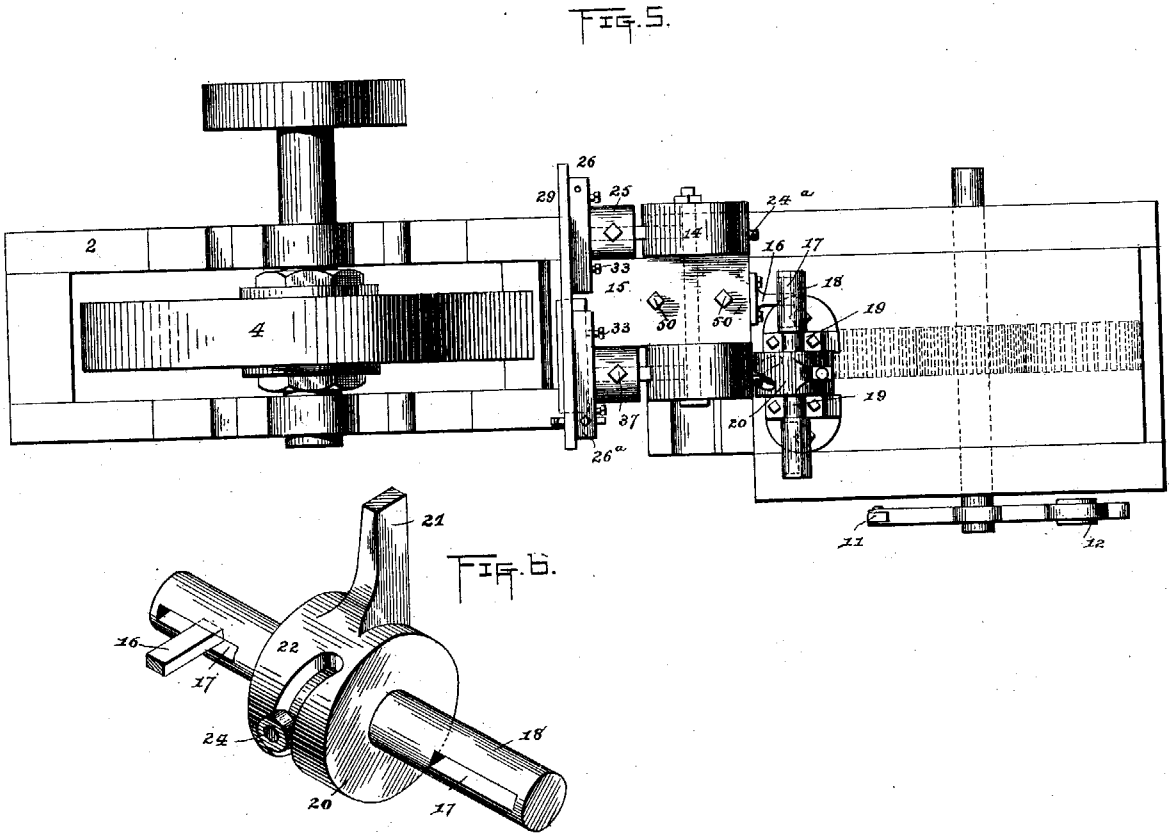
Witnesses
S. Lochbochler
James H. Bakewell.
Inventor
W. R. Dickson
by his attorneys
Bakewell & Kerr
N. PETERS, Photo-Lithographer, Washington, D. C.

UNITED STATES PATENT OFFICE.

WILLIAM R. DICKSON, OF PITTSBURG, PENNSYLVANIA.

GRINDING OR POLISHING MACHINE.

SPECIFICATION forming part of Reissued Letters Patent No. 10,812, dated March 1, 1887.

Original No. 354,627, dated December 21, 1886. Application for reissue filed February 3, 1887. Serial No. 226,462.

*To all whom it may concern:*

Be it known that I, WILLIAM R. DICKSON, of Pittsburg, in the county of Allegheny and State of Pennsylvania, have invented a new and useful Improvement in Grinding or Polishing Machines; and I do hereby declare the following to be a full, clear, and exact description thereof, reference being had to the accompanying drawings, forming a part of this specification, in which—

Figure 1 is a side elevation of my improved machine. Fig. 2 is a perspective view of one of the parts shown in Figs. 1 and 3. Fig. 3 is a perspective view of detached parts, illustrating the knife-operating mechanism. Fig. 4 is a vertical cross-section on the line *x x* of Fig. 3. Fig. 5 is a plan view of the machine. Fig. 6 is a perspective view of a part.

Like symbols of reference indicate like parts in each.

My invention relates to that class of grinding-machines in which the blank or other object to be ground is movable relatively to the rotating periphery of a grindstone.

The frame of the machine is constructed in any manner suitable to support the axis of the grindstone 4 and the devices for holding and moving the knife or other object to be ground, and consists, in the present instance, of a platform, 2, and legs 3.

On the forward part of the platform 2, in suitable slide-bearings, is mounted a sliding frame, 5, which carries both the knife-holder and mechanism for so moving the latter as to secure its proper inclination to the grindstone. A rack, 6, is affixed to the under side of the frame 5, parallel with the side of the grindstone, and is operated by a toothed pinion, 7, which is journaled in housings 8. A lever, 9, which is fixed to the projecting shaft of the pinion 7, is at one end connected to a treadle, 10, by a connecting-rod, 11, and at the other end bears a counter-weight, 12. By depressing the treadle the pinion is given a partial rotation forward, and on releasing the treadle the counter-weight 12 will turn it back again to its original position. A laterally-sliding frame, 13, is movably mounted by a tenon in a beveled mortised groove on the surface of the sliding carriage 5. At its inner end, next the grindstone, this frame supports two parallel cheeks or housings, 14, between which is pivoted a longitudinally-oscillating carrier-head, 15. 23 represents the trunnions on which this head is pivoted. The outer end of the head 15 has a projecting tongue, 16, fitting within a longitudinal slot, 17, in a transversely-journaled shaft, 18. This shaft is journaled in and supported by housings 19 on the sliding frame 5, and at an intermediate point between its journals has a disk or collar, 20, keyed to it, and a lever-handle, 21, affixed to the disk, Figs. 1, 5, and 6. If the shaft 18 be rotated by moving the handle 21 in the direction of the arrow A, its slot 17 will raise the pin 16, and will tilt the carrier 15 forward on its axis. The surface of the collar 20 is provided with a laterally-inclined peripheral groove, 22, and a pin, 24, affixed to the sliding frame 13, has at its end a friction-roller which fits within the groove. (See Fig. 6.) The grooved disk 20 thus acts as a lateral cam, and as it is rotated will, by means of the pin 24, move the transversely-sliding frame 13 in its ways across the frame 5 and at right angles to the sides of the grindstone. The slot 17 is elongated, so as to permit the transverse movement of the tilting pin 16 with the sliding frame. The end of the pivoted head next the grindstone has two upright bracket-pieces, 25, the faces of which have separate transverse bars or heads 26 26ª, pivoted to them by pins 27. The faces of the pivoted heads 26 26ª are slotted longitudinally, as at 28, Fig. 2, by slots extending from their inner ends toward the outer ends, and a cross-bar, 29, forming the back of the knife-holding device, abuts against the faces of the heads, (see Fig. 3,) and has a longitudinal slot, 30, which extends through the body of the bar.

The bar 29 is held in place against the face of one of the pivoted heads by means of a plate, 31, which, when the head and bar are horizontal, so that their slots are opposite to each other, is inserted through the slot 30 into the slot 28. The holder-bar 29 is fastened to the other head, 26ª, by a stud bolt or bolts, 32, entering one or several screw-holes. (Shown in the figure of the drawings last referred to.) The corresponding screw-holes in the head 26ª are arranged in different positions, so that by turning the head 26 on its axis the holder-bar 29 may be raised and lowered therewith, and may be fastened at desirable positions by bringing one of the screw-holes in its body opposite to the proper hole in the head 26ᵃ, and then inserting the bolt. In this manner the bar 29 may be given any desired inclination to the horizontal.

As will be seen in the drawings, the pivoted heads 26 and 26ᵃ and both ends of the bar 29 are similarly constructed, so that the plate 31 may be inserted to fasten the bar 29 rigidly to either of the pivoted heads and the other left to be fastened to it by the bolt 32. The plate 31 is arranged to project from the face of the bar 29, and forms a shelf on which the knife-blanks rest while being sharpened. Set-screws 33 enter the rear of the heads 26 26ᵃ into the back of the slots 28, and by being screwed in will project the plate 31 to any desirable distance. There are holes 34 in the bar 29, one at each end of the slot 30, and similar holes, 34ᵃ, are made in the heads 26 and 26ᵃ. These holes serve as sockets, into which the shanks of a hooked support, 35, may be inserted. A set-bolt, 36, traverses the pivoted head 26 and bears upon the shank of the hook, thus holding it in proper place. 37 are similar set-bolts, which bear upon the axes of the heads 26 26ᵃ in their bearings in the uprights 25 and enable the heads to be held rigidly in any desired position.

Thus constructed the operation of the machine is as follows: A knife-blank is set upon the shelf 31 inside of the hook 35, the grindstone is set in motion, and the operator depresses the treadle 10. This rotates the pinion 7, which, acting on the rack 6, advances the sliding frame or carriage 5, with its supported mechanism and the knife, toward the stone, bringing the side of the knife-blank up to or near to the latter. The hand-lever 21 is then moved in the direction of the arrow, and this causes two motions of the knife-blank, the first a forward motion on the trunnions 23, which brings the upper edge of the knife against the revolving stone and turns the blank to give the desired taper and curve to the edge. The second motion of the knife-blank is longitudinal and at right angles to the plane of the stone, which brings the blank in contact with different parts of the stone and prevents the latter from wearing unevenly. This motion is induced by the action of the cam-groove 22 and the stud 24 of the transversely-moving carriage 13. By carefully governing the extent and time of motion of the lever 21 the exact amount of taper and curve to be given to the different parts of the blade may be obtained. On releasing the treadle 10 the counter-weight 12 will reverse the pinion 7, and will withdraw the carriage 5 and the knife-blank from the grindstone into their original positions.

In grinding many kinds of knives it is necessary to hold them in an inclined position against the periphery of the stone. This may be done by tilting the head 26 in the proper direction and its affixed bar 29 on the axis 27, and then fastening the other end of the bar to the head 26ᵃ, as before described. In this way the blank may be inclined in either direction. It will be understood that when the knife supporting shelf 31 and the hook 35 are on one side of the machine—say the right-hand side, as shown in Fig. 3—only one side of a knife-blank may be ground, the other side being ground in a separate machine. The machine may, however, be changed to grind either side of the blade by shifting the plate 31 and the hook 35 from one end of the bar 29 to the other. This is illustrated by Figs. 1, 5, and 3, in the first two of which the knives are set and placed by a workman on the left of the machine, and in Fig. 3 the shelf and hook are reversed and the knives inserted on the right. When the machine is thus altered from a right-hand to a left-hand machine, it is desirable to shift the sliding frame 13 correspondingly. I have shown means for doing this in Figs. 5 and 6, in which the shaft 18 is provided with slots 17 on each side of the cam-disk. The frame can therefore be moved from the right side, in which it is shown in Fig. 5, to the left side, and the tongue 16 inserted into the slot on that side. For the same purpose the right head or housing 14 should have a tongue, 24ᵃ, which in case of shifting the frame would take the place of the other tongue in the cam 20.

As convenient means for fixing the limits of oscillation of the pivoted head 15, there are set-bolts 50, which project downward from the head on each side of the trunnions 23, and by engaging the top of the carriage 5 restrict the motions of the head within the limits to which the set-bolts are adjusted.

By use of the machine before described the grinding of knives, axes, and other edged tools may be done rapidly, efficiently, and with a minimum of labor. The machine may also be used as a polishing-machine by substituting an emery-wheel in place of the grindstone 4.

I do not desire to limit myself to the employment of the precise mechanism shown for effecting the described motions of the several parts; but

What I claim as my invention, and desire to secure by Letters Patent, is—

1. In a grinding or polishing machine, the combination of a grindstone, a knife-carrier head situate opposite to the periphery thereof, a frame in which said carrier-head is pivoted and is vertically oscillatory, said frame being movable laterally relatively to the stone, and mechanism, substantially as described, for simultaneously oscillating the carrier-head and moving the frame laterally, substantially as and for the purposes described.

2. The combination of a grindstone, a knife-carrier head situate opposite to the periphery thereof, a frame in which said carrier-head is pivoted and is vertically oscillatory, said frame being movable laterally relatively to the stone, and a cam, 20, bearing on said frame and rotary to move it laterally, substantially as and for the purposes described.

3. The combination of a grindstone, a knife-carrier head situate opposite to the periphery thereof, a frame in which said carrier-head is pivoted and is vertically oscillatory, said frame being movable laterally relatively to the stone, a cam, 20, bearing on said frame and rotary to move it laterally, and a shaft, 18, rotary with the cam and connected with the knife-carrier head by tilting mechanism for oscillating it, substantially as and for the purposes described.

4. The combination of the oscillatory head 15, heads 26 26[a], pivoted thereto and provided with slots 28, a slotted bar, 29, connecting the heads, and a shelf, 31, capable of insertion into the slots in the bar 29 and into the slot of one of the heads 26 or 26[a], substantially as and for the purposes described.

5. In a grinding or polishing machine, the combination of a grindstone, a carriage, 5, movable toward and away from the stone, a frame, 13, mounted on the carriage and movable thereon transversely to the plane of the stone, a knife-carrier head pivoted to the frame 13, so as to be vertically oscillatory thereon, and a cam and lever for simultaneously imparting said motion to the frame 13 and the knife-carrier head, substantially as and for the purposes described.

6. In a grinding or polishing machine, the combination of a grindstone, a knife-carrying head vertically oscillatory theretoward, and a knife-supporting frame pivoted to the head and movable vertically on its pivot, for the purpose of changing the inclinations of the knife-blank from a horizontal position, substantially as and for the purposes described.

7. In a grinding or polishing machine, the combination of a grindstone, a knife-carrying head, 15, vertically oscillatory theretoward, heads 26 26[a], pivoted to the head 15 and vertically oscillatory, a bar, 29, connecting the heads 26 26[a], and provided with a shelf for supporting the knife-blank, and devices for adjustably securing the bar to the heads, whereby the supported blank may be inclined, substantially as and for the purposes described.

8. In a grinding or polishing machine, the combination, with a grindstone, of a pivoted knife-carrier head situate opposite to the periphery thereof and movable laterally relatively thereto, a rotary shaft connected with the head and arranged to oscillate it, and also connected with the head by power connections which move it laterally, whereby a simultaneous oscillation and lateral movement may be imparted to the head, substantially as and for the purposes described.

In testimony whereof I have hereunto set my hand, January 27, 1887.

WILLIAM R. DICKSON.

In presence of—

THOMAS W. BAKEWELL,
J. K. SMITH.